United States Patent
Pasupuleti et al.

(10) Patent No.: US 11,455,219 B2
(45) Date of Patent: Sep. 27, 2022

(54) HIGH AVAILABILITY AND AUTOMATED RECOVERY IN SCALE-OUT DISTRIBUTED DATABASE SYSTEM

(71) Applicant: Oracle International Corporation, Redwood Shores, CA (US)

(72) Inventors: Krishna Kantikiran Pasupuleti, Foster City, CA (US); Boris Klots, Belmont, CA (US); Vijayakrishnan Nagarajan, Redwood City, CA (US); Anantha Kiran Kandukuri, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 51 days.

(21) Appl. No.: 17/077,028

(22) Filed: Oct. 22, 2020

(65) Prior Publication Data
US 2022/0129358 A1     Apr. 28, 2022

(51) Int. Cl.
*G06F 11/00* (2006.01)
*G06F 11/20* (2006.01)
(Continued)

(52) U.S. Cl.
CPC ........ *G06F 11/2028* (2013.01); *G06F 11/203* (2013.01); *G06F 11/2041* (2013.01);
(Continued)

(58) Field of Classification Search
CPC .............. G06F 11/2028; G06F 11/203; G06F 11/2041; G06F 16/2453; G06F 16/24532;
(Continued)

(56) References Cited

U.S. PATENT DOCUMENTS

| 9,031,944 B2 | 5/2015 | Cao |
| 9,053,167 B1 | 6/2015 | Swift et al. |

(Continued)

FOREIGN PATENT DOCUMENTS

EP     2973054 A1     1/2016

OTHER PUBLICATIONS

Amsaleg et al., "Scrambling Query Plans to Cope With Unexpected Delays", 1996, 12 pages.

*Primary Examiner* — Michael Maskulinski
(74) *Attorney, Agent, or Firm* — Hickman Becker Bingham Ledesma LLP; Brian N. Miller

(57) ABSTRACT

Herein are acceleration techniques for resuming offloaded execution by replacing a failed computer with a hot spare computer. In an embodiment, a distributed system configures a DBMS, a set of participating computers, and a set of spare computers. The DBMS receives a query of a database. From the query, an offload query plan is generated for distributed execution. The DBMS sends the offload query plan and a respective portion of the database to each participating computer. The distributed system detects that a participating computer failed after the offload query plan was sent. Responsively, the DBMS sends the same offload query plan and same respective portion of the database of the failed computer to a replacement computer from the spare computers. Despite the computer failure, the DBMS receives results of successful distributed execution of the offload query plan that include a result from the replacement computer.

19 Claims, 7 Drawing Sheets

(51) Int. Cl.
*G06F 16/2453* (2019.01)
*G06F 16/2455* (2019.01)

(52) U.S. Cl.
CPC .. *G06F 16/24549* (2019.01); *G06F 16/24553* (2019.01); *G06F 2201/805* (2013.01)

(58) Field of Classification Search
CPC .... G06F 16/27; G06F 16/278; G06F 11/0709; G06F 11/0712; G06F 11/0724; G06F 11/16; G06F 11/202–2051
See application file for complete search history.

(56) References Cited

U.S. PATENT DOCUMENTS

| | | | |
|---|---|---|---|
| 9,069,827 B1 | 6/2015 | Rath et al. | |
| 9,384,227 B1 | 7/2016 | Xiao | |
| 9,489,443 B1 | 11/2016 | Muniswamy-Reddy et al. | |
| 9,600,500 B1 * | 3/2017 | Gupta | G06F 16/2308 |
| 9,779,117 B1 | 10/2017 | Guo | |
| 2005/0154740 A1 | 7/2005 | Day et al. | |
| 2005/0198102 A1 | 9/2005 | Hahn | |
| 2006/0036989 A1 | 2/2006 | Chaudhuri | |
| 2006/0085484 A1 | 4/2006 | Raizman | |
| 2008/0263001 A1 | 10/2008 | Lohman | |
| 2009/0055828 A1 | 2/2009 | McLaren | |
| 2009/0132541 A1 * | 5/2009 | Barsness | G06F 16/24532 707/E17.14 |
| 2009/0144303 A1 | 6/2009 | Bhide | |
| 2009/0144346 A1 | 6/2009 | Duffy | |
| 2009/0157776 A1 | 6/2009 | McGarvey | |
| 2010/0030741 A1 | 2/2010 | Johnson | |
| 2010/0262687 A1 | 10/2010 | Shen | |
| 2010/0281027 A1 | 11/2010 | Duan | |
| 2011/0161294 A1 | 6/2011 | Vengerov | |
| 2011/0225122 A1 | 9/2011 | Denuit | |
| 2012/0144234 A1 | 6/2012 | Clark et al. | |
| 2013/0226959 A1 | 8/2013 | Dittrich | |
| 2013/0232176 A1 | 9/2013 | Plattner | |
| 2014/0012881 A1 | 1/2014 | Roesch | |
| 2014/0164353 A1 * | 6/2014 | Shankar | G06F 16/24554 707/718 |
| 2014/0279892 A1 | 9/2014 | Bourbonnais | |
| 2014/0310258 A1 * | 10/2014 | Tian | G06F 16/2471 707/718 |
| 2014/0337392 A1 | 11/2014 | Gorde | |
| 2016/0253402 A1 | 9/2016 | Klots et al. | |
| 2018/0039534 A1 * | 2/2018 | Cai | G06F 11/0709 |
| 2018/0121326 A1 | 5/2018 | Qi et al. | |
| 2021/0365456 A1 * | 11/2021 | Kondiles | G06F 16/248 |

\* cited by examiner

HIGH AVAILABILITY AND AUTOMATED RECOVERY IN SCALE-OUT DISTRIBUTED DATABASE SYSTEM

FIELD OF THE INVENTION

The present invention relates to horizontally-scaled offloading of database query execution. Herein are acceleration techniques for resuming offloaded execution by replacing a failed computer with a hot spare computer.

BACKGROUND

Scale-out systems for horizontally-scaled offloading of processing to other computers are becoming increasingly important for enterprise computing. As the scale and the size of such systems grow, the number of hardware and software components also grows, and this leads to decreased mean time between failures (MTBF). This means that fault tolerance, high availability (HA), and automated recovery are important features for avoiding outages of such systems.

Node computer failures are inevitable in a distributed system and somewhat frequent in a scale-out system with thousands of node computers. When node computers fail or new node computers join, data may need to be redistributed among them. Existing approaches to solving HA challenges posed by node computer failures and/or membership changes in the distributed system, such as removal of a node computer that fails and/or addition of a new node computer, have the following shortcomings. Data redistribution is limited to a few node computers by employing techniques like consistent hashing to distribute data among node computers. Membership changes may cause queries that are running to fail and not be restarted unless resubmitted by a client application. When failure happens in existing approaches, a query from a client application receives an error from the distributed system, and the system relies on the client application logic to correctly handle this, and to properly resubmit the request. In case of an interactive client, it is often assumed that it will be the user who will resubmit the query again. If resubmits are too frequent, user experience of interactive users will be degraded.

DETAILED DESCRIPTION

Figure 1:
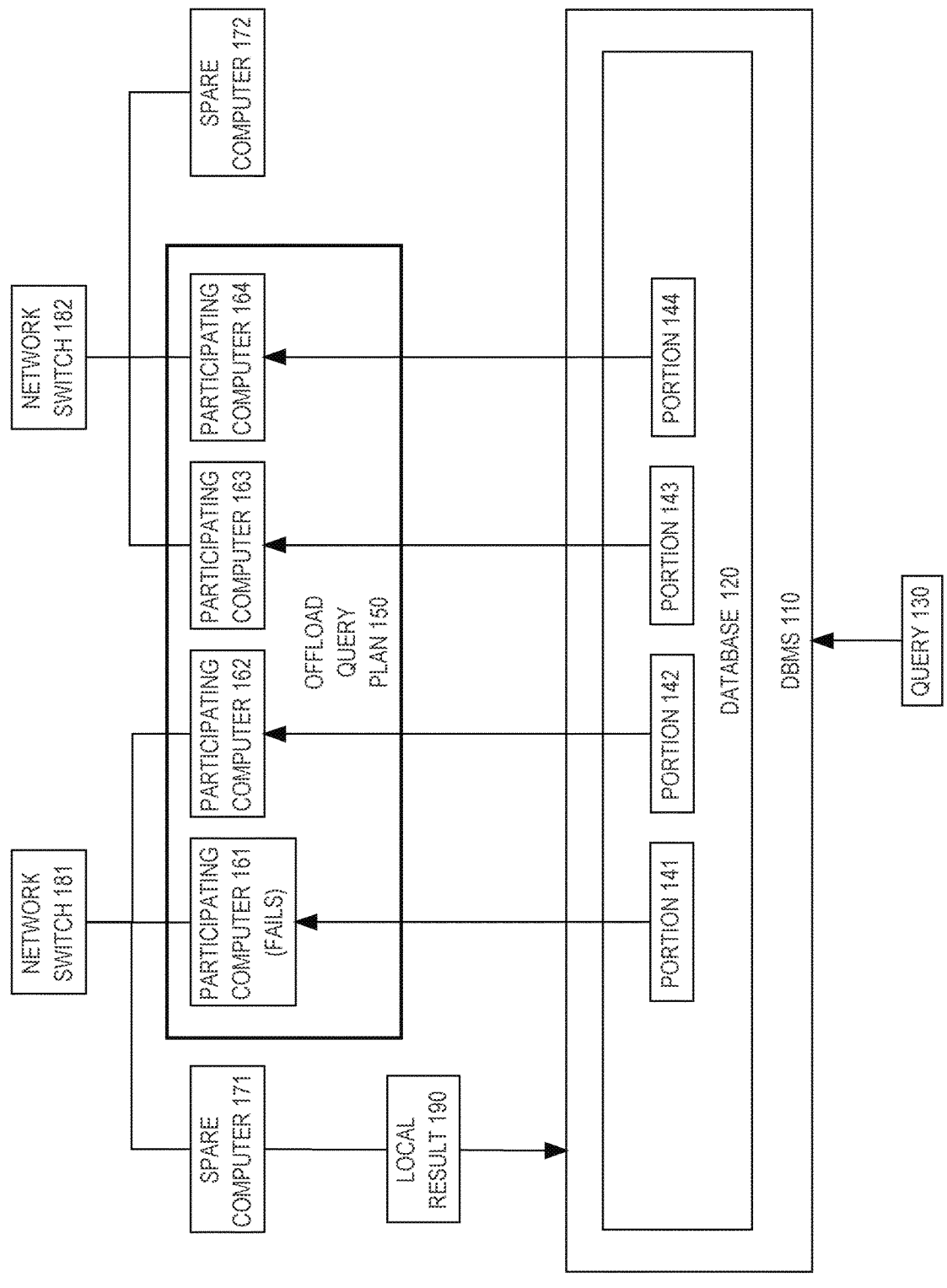
FIG. 1 is a block diagram that depicts an example distributed system that has horizontally-scaled offloading of database query execution and accelerates restarting offloaded execution by replacing a failed computer with a hot spare computer.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches herein provide improved and accelerated recovery actions for failed execution of a database query that was delegated to many computers. Computer failure is tolerated, and disruption is reduced for queries that are running in a massively distributed system when failure happens. A few computers are reserved as "spares" and when a failure happens, one of the spare computers is automatically inducted to replace a failed computer. The induction of a spare computer into the system of actively participating computers, including loading of a relevant fragment of data, is a quick and efficient process that is achieved by a controller computer such as a database server of a database management system (DBMS), which reduces disruption to the system in an automated fashion that is transparent for the query client.

In an embodiment, a relational DBMS (RDBMS) operates a foreground process that submits a whole or part of a query to an analytical query processing system comprised of multiple node computers. Each of the node computers hosts fragments of the dataset required for processing of the query. Different node computers host different fragments of the data and together (as a union of fragments) they may host a whole dataset. An offload query plan is sent to the participating computers of the node computers, and each participating computer executes the offload query plan based on the respective fragment of data hosted locally. Depending on the nature of the query, participating computers may or may not exchange data with each other during query processing. Upon completion of processing, each participating computer sends a resulting dataset to the RDBMS process that initiated the query offload. The RDBMS process waits for the result data to be returned by each participating computer separately and may forward that to the query client.

In an embodiment, thousands of participating computers in a distributed system form a hierarchy managed by a monitor computer and the multiple monitor computers interface with the RDBMS server. The placement and assignment of monitor computers and their set of managed participating computers can be influenced by various factors such as network topology. Node computers may be grouped into so-called domains. Each domain may have a set of participating computers that execute queries and a set of spare computers that do not and are reserved for fault tolerance.

Herein is significantly improved behavior of scale-out systems that facilitates quick recovery from failures and keeping failures invisible to interactive users and client applications. This advantage becomes increasingly important for high availability due to growth trends in the industry for distributed systems and especially because the mean time between failures (MTBF) contracts as the number of participating computers grows. Approaches herein are applicable both to a shared memory RDBMS and to distributed systems.

In an embodiment, a distributed system configures a DBMS, a set of participating computers, and a set of spare computers. The DBMS receives a query of a database. From the query, an offload query plan is generated for distributed execution. The DBMS sends the offload query plan and a respective portion of the database to each participating computer. The distributed system detects that a participating computer failed after the offload query plan was sent. Responsively, the DBMS sends the same offload query plan and same respective portion of the database of the failed computer to a replacement computer from the spare computers. Despite the computer failure, the DBMS receives results of successful distributed execution of the offload query plan that include a result from the replacement computer.

1.0 Example Distributed System

FIG. 1 is a block diagram that depicts an example distributed system 100, in an embodiment. Distributed system 100 has horizontally-scaled offloading of database query execution and accelerates restarting offloaded execution by replacing a failed computer with a hot spare computer. A hot spare is a computer that can be converted from a spare to an active participant without human intervention nor system downtime. Distributed system 100 contains database management system (DBMS) 110 and computers 161-164 and 171-172, each of which may be a rack server such as a blade, a personal computer, a mainframe, a virtual computer, or other computing device. Computers 161-164 and 171-172 and DBMS 110 are interconnected by a communication network (not shown).

DBMS 110 is hosted by other computer(s) (not shown) and not by computers 161-164 and 171-172. DBMS 110 hosts database 120 that is a bulk datastore such as a relational database. Data stored in database 110 may reside in volatile and/or nonvolatile storage.

In operation, DBMS 110 receives query 130 to analyze and/or retrieve data from database 110. In various embodiments, query 130 is expressed as data manipulation language (DML) such as a create read update delete (CRUD) statement or query by example (QBE). For example, query 130 may be a structured query language (SQL) DML statement such as a query. In an embodiment, query 130 is received through open database connectivity (ODBC).

1.1 Query Planning

DBMS 110 analyzes query 130, such as during query planning, to determine which portions of query 130 may DBMS 110 offload to participating computers 161-164 for accelerated execution with horizontal scaling. As a preface to offloading, DBMS 110: a) generates offload query plan 150 for participating computers 161-164, and b) identifies and sends respective portions 141-144 of database 120 to participating computers 161-164.

Query planning is a preparatory phase of query execution that determines how execution of query 130 should be implemented. For demonstration, query planning may be regarded as a linear process that generates, in the following ordering, the following artifacts in sequence such that a next artifact is generated based on the previous artifact: a) a parse tree of query 130 that may be an initial query plan that is independent of hardware and composed of relational operators that manipulate database data such as according to relational algebra, and b) a pair of cooperating query plans, including an optimized query plan (not shown) for execution by DBMS 110 and offload query plan 150 that is optimized for offloaded execution of query 130.

Neither of the query plans generated in (b) need be individually capable of entirely executing query 130 so long as both query plans cooperate to fulfil query 130. For example, an original query plan may be a parse tree of query 130, and a subtree of the original query plan may be designated as offload query plan 150. In an example not shown, multiple subtrees of the original query plan may be designated as multiple offload query plans to be concurrently or sequentially offloaded. The remainder of the original query plan, without the offloaded subtree(s), becomes a query plan for DBMS 110.

In any case, the query plan for DBMS 110 and/or offload query plan 150 may be optimized and/or compiled. In one example and according to offload query plan 150, participating computers 161-164 do or do not cooperate with each other and cooperate with the optimized query plan that DBMS 110 executes. Interactions between participating computers and/or DBMS 110 are discussed later herein.

1.2 Data Portions

Depending on the scenario, portions 141-144 of database 120 may be various subdivisions of content of database 120 such as non-overlapping data partitions, partially overlapping partitions, or data replicas. For example, portions 141-144 may be horizontal partitions composed of mutually exclusive subsets of rows of relational table(s) (not shown) or rows of tabular intermediate results generated locally by the participating computer or intermediate results received from a generating other participating computer.

For example, offload query plan 150 may specify a sequence of processing phases that each participating computer 161-164 should execute as discussed later herein, including: a) receiving a respective portion of database 120 into volatile or nonvolatile storage or as a stream of individual or batches of tabular input rows, b) processing the input rows to generate output rows, c) retaining the output rows locally for further processing according to offload query plan 150, d) sending the output rows to DBMS 110 such as local result 190, and/or e) sending respective portions of the output rows to other participating computers for further processing according to offload query plan 150.

Each participating computer 161-164 concurrently executes offload query plan 150 to generate a respective structurally similar local result such as 190. Local result 190 may be a scalar value or a set of values. For example, a local result may be tabular such as a row set or a set of columnar vector(s). When portions 141-144 are horizontal partitions, local results from different computers 161-164 may be structurally similar such as similar row sets having same columns but different amounts and values of data. For example none, some, or all local results of computers 161-164 may be empty.

1.3 Fault Tolerance

During distributed execution of offload query plan 150, any of participating computers 161-164 may fail, which may be more or less catastrophic with other approaches. For example, participating computer 161 is shown as failing. Computer failure may entail any of: a software crash of a computer program, an operating system failure such as a kernel panic, or a hardware failure such as a disk crash, a parity error, or a power outage. A software crash may be caused by a null pointer, violation or exhaustion of an address space, or a timeout such as due to a synchronization deadlock or an infinite loop.

At a minimum when participating computer 161 fails, other approaches will abort or abandon query 130, fail any transaction that includes query 130 such as an atomic consistent isolated durable (ACID) transaction, and report a timeout or other error to a client that submitted query 130. Those approaches would force the client to decide how to recover from the failure of query 130 such as by resubmission, in which case work in progress by query 130 is lost and execution of query 130 is restarted from the beginning. Distributed system 100 can avoid those penalties as follows.

Distributed system 100 contains hot spare computers 171-172 that ordinarily do not receive a query plan for executing part of query 130 and ordinarily do not generate a partial result. Depending on the embodiment or scenario during offloaded execution of query 130, any of spare computers 171-172 may: a) idle, b) contribute to offloaded execution of query 130 in an ancillary way that does not entail a query plan, such as cache original data or intermediate results, and/or receive and execute a query plan for a different query. In an embodiment, spare computers 171-172 do not receive and execute query plans for any queries unless replacing a failed computer as described below. In an embodiment, computer 163 simultaneously is a participating computer for one query and a spare computer for another query.

Spare computers 171-172 are hot spares because they may passively stand by while waiting for a participating computer to fail. DBMS 110 may detect that participating computer 161 has failed and select one of spare computers 171-172 to replace failed computer 161 by becoming a participating computer that receives and executes same query plan 150 that failed computer 161 had attempted to execute. Dynamic recovery activities such as failure detection, spare computer selection, conversion of a spare computer into a participating computer, and query plan resumption are discussed later herein.

In any case, computer 171 ceases to be a spare computer and instead becomes a participating computer that replaces failed computer 161. As a replacement, computer 171 receives and executes same query plan 150, including receiving a copy of same portion 141, to generate partial result 190 that failed computer 161 would have generated. No matter which of computers 161 and 171 fully executes query plan 150 and no matter which of computers 161 and 171 generates and sends partial result 190 to DBMS 110, partial result 190 will be identical or logically equivalent. For example if ordering of values or rows in partial result 190 is significant, then either of computers 161 and 171 should generate a same ordering. If values or rows in partial result 190 may be unordered, then ordering may depend on which of computers 161 and 171 generates partial result 190 or may be arbitrary.

When participating computer 161 fails, offload query plan 150 does not need regeneration and can be reused as is, so long as a spare computer is available to replace failed computer 161. In other words, offload query plan 150 is portable such that its execution with data portion 141 can be attempted and reattempted on any number of computers in sequence that are sent copies of data portion 141, and eventually some computer will succeed at executing offload query plan 150 with data portion 141. Thus, distributed system 100 has fault-tolerant query processing. Query plan portability and reuse and system fault tolerance are discussed later herein.

1.4 Network Topology

As discussed later herein, converting a spare computer into a participating computer may be communication intensive. For example, failure of participating computer 161 may cause spare computer 171 to receive query plan 150 and portion 141 that may contain gigabytes of data. However, failure may be infrequent and occur during few queries, whereas communication between subsets of participating computers such as to exchange intermediate results may be frequent and occur during many or most queries. For example, distributed graph analytics is notorious for messaging amongst participating computers, which is peer to peer communication.

Peer to peer messaging performance is more dependent on latency than throughput, such that the topology of distributed system 100 affects distributed query execution as follows. Due to numerosity of computers 161-164 and 171-172 or fault tolerance or geography, computers 161-164 and 171-172 might not share a same local area network (LAN), subnet, and/or network switch such as 181-182.

Such logical and physical separation and segmentation of distributed system 100 may cause non-uniform network latency and throughput depending on which two network elements are intercommunicating such as which of computers 161-164 and 171-172 and DBMS 110. For example, each of network switches 181-182 and DBMS 110 may reside in same or separate datacenters. In any case, each of network switches 181-182 may be a switch, a hub, a router, or a bridge.

For example, the topology of distributed system 100 may be hierarchical such that participating computers 163-164 are directly connected to same network switch 182 as shown. Whereas, communication between participating computers 162-163 passes through at least two network switches 181-182 and possibly through additional switches such as with a global internet. Thus, peer to peer messaging may have non-uniform latency and colocation of directly cooperating participating computers is faster.

For example if each participating computer exchanges data with only one respective other participating computer, such that cooperation precisely occurs in pairs of participating computers, then both participating computers of a same pair communicate faster if directly connected to a same switch, and it may not matter that different pairs reside in separate LANs. Thus, communication patterns and communication partner assignments may be specified in query plan 150 to maximize proximity.

Proximity concerns also affect the initial distribution of spare computers and affect the selection of a spare computer to replace a failed computer. Proximity amongst directly cooperating participating computers is preserved if a failed computer and a spare computer that replaces the failed computer are both directly connected to a same network switch. Because any participating computer connected to any network switch may fail, a respective spare computer should be directly connected to each network switch as shown.

As discussed later herein, multiple participating computers may fail, and multiple spare computers may be converted as replacements. Because multiple failed computers may be directly connected to a same network switch, equal amounts of multiple spare computers should be directly connected to each switch. In an embodiment, computers 161-164 and 171-172 are divided into groups known herein as failure domains. For example, the failure domain of a computer may or may not depend on which of switches 181-182 is directly connected to the computer. In an embodiment, spare computers are equally or proportionally distributed amongst failure domains. For example if network switch 181 has twice as many communication ports and is connected to twice as many participating computers as network switch 182 is, then network switch 181 may also have twice as many spare computers. In an embodiment, a failed computer should only be replaced by a spare computer in the same failure domain.

2.0 Example Fault Tolerance Process

Figure 2:
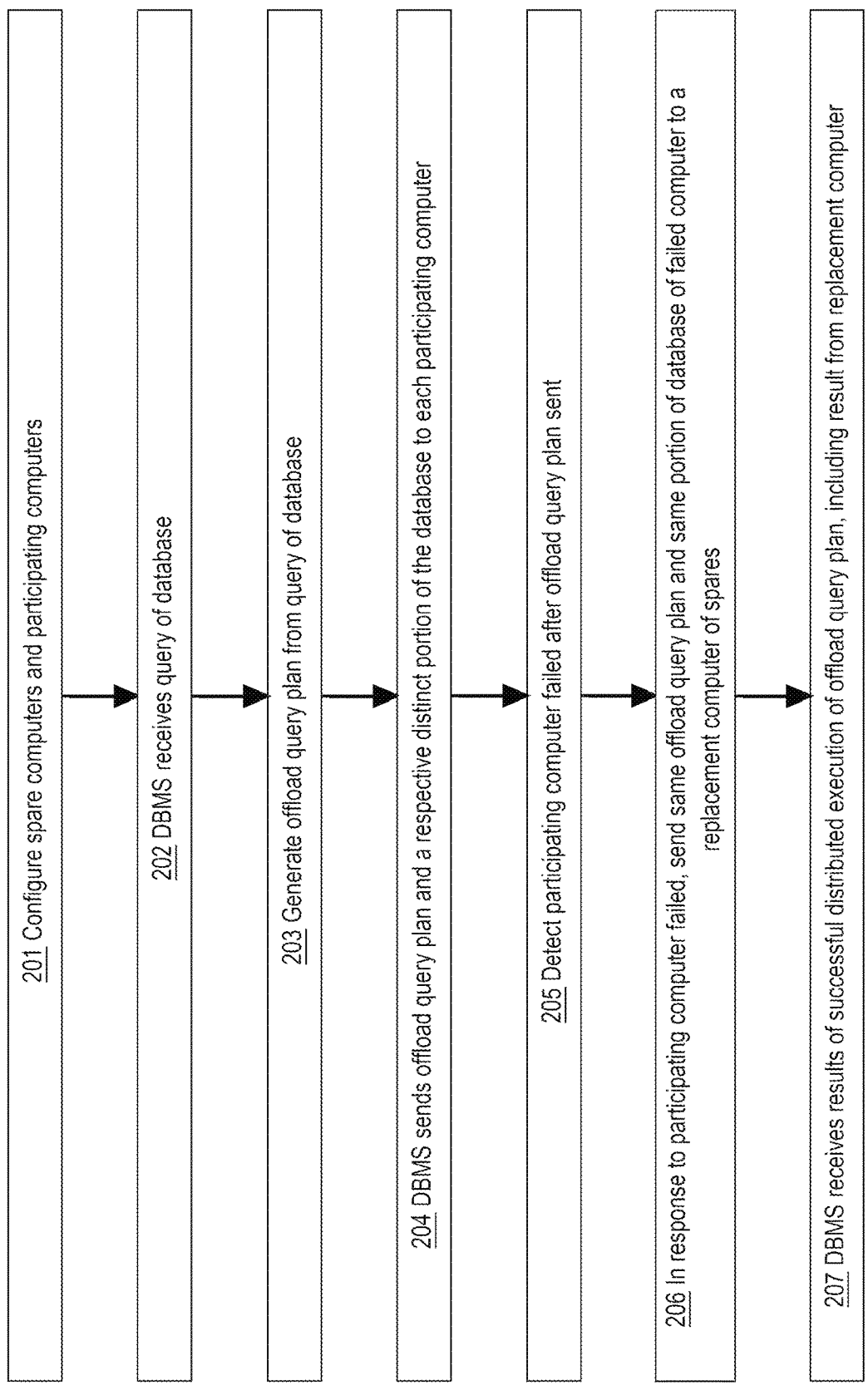
FIG. 2 is a flow diagram that depicts an example process that a distributed system may perform to restart distributed execution of an offload query plan, including replacing a failed computer with a hot spare computer.

FIG. 2 is a flow diagram that depicts an example process that distributed system 100 may perform to restart distributed execution of offload query plan 150, including replacing failed computer 161 with hot spare computer 171. FIG. 2 is discussed with reference to FIG. 1.

Step 201 configures: a) participating computers 161-164 to receive and execute offload query plans and b) spare computers 171-172 to await conversion as replacement computers. An embodiment may contain more than two thousand participating computers. In an embodiment, DBMS 110 creates an identifier map (not shown) that is a bidirectional mapping of physical identifiers to logical identifiers of participating computers 161-164.

For example, a physical identifier may comprise: a) a host identifier such as an internet protocol (IP) address or a host name, or b) a uniform resource locator (URL) that contains a host identifier. A logical identifier may be an integer such as a serial number or an array offset. Thus, no matter how complex are physical identifiers such as for network transport, query plan 150 may refer to the set of participating computers by a sequence of numbers such as 1-1,000. DBMS 110 sends copies of the identifier map to participating computers 161-164 for retention and use during distributed query execution.

In step 202, DBMS 110 receives query 130 of database 120. Query 130 does not reference computers 161-164 and 171-172. Step 203 generates offload query plan 150 from query 130. Offload query plan 150 may be based on a count of participating computers 161-164. Offload query plan 150 may contain logical identifiers of participating computers 161-164. Offload query plan 150 does not contain: a) physical identifiers of participating computers 161-164, nor b) references to portions 141-144 of database 120.

In step 204, DBMS 110 sends offload query plan 150 and a respective distinct portion of database 120 to each participating computer. Step 204 does not send offload query plan 150 nor portions 141-144 of database 120 to spare computers 171-172. In various embodiments, participating computers 161-164 receive respective data portions 141-144 entirely or in parts as individual or batches of tabular rows in respective streams. In an embodiment, participating computers may be diskless and lack nonvolatile storage for data portions 141-144, in which case participating computers store data portions 141-144 only in volatile storage.

Offload query plan 150 may be compiled by DBMS 110 before sending or compiled by participating computers 161-164 after receiving or executed without compilation. Between steps 204-205, participating computers 161-164 begin distributed execution of offload query plan 150 with respective data portions 141-144. Also between steps 204-205, participating computer 161 fails while executing offload query plan 150 with data portion 141.

Step 205 detects that participating computer 161 failed after sending offload query plan 150. In an embodiment, a threshold amount of heartbeats not received from a participating computer causes detection that the participating computer has failed. In an embodiment, loss of a network connection to the participating computer causes detection that the participating computer has failed. In an embodiment, monitoring of heartbeats and connections for all participating computers is performed by DBMS 110. In an embodiment, such monitoring is instead performed by a separate computer for each failure domain such as a respective monitor computer for each of network switches 181-182. Monitoring computers may relay status of participating computers to DBMS 110.

In various scenarios none, some, or all of surviving participating computers 162-164: a) detect that participating computer 161 failed and abort execution of offload query plan 150, b) are directed by a monitor such as DBMS 110 to abort execution of offload query plan 150, c) continue execution of offload query plan 150, and/or d) have already finished execution of offload query plan 150. As discussed later herein, DBMS 110 and/or surviving participating computers 162-164 may react in additional ways to failure of participating computer 161.

In response to failure of participating computer 161, step 206 sends same offload query plan 150 and same data portion 141 of failed computer to replacement computer 171 of the spare computers, and offload query plan 150 and data portion 141 may be sent separately as discussed later herein. Between steps 206-207, DBMS 110 may direct surviving participating computers 162-164 and replacement computer 171 to restart execution of offload query plan 150. Such restarting may entail aborting any previous and sill ongoing execution of offload query plan 150. Such restarting need not entail resending respective portions 142-144 to surviving participating computers 162-164 because portions 142-144 may be locally retained despite a query restart. In that way, query restart is accelerated.

In step 207, DBMS 110 receives results of successful distributed execution of offload query plan 150, including local result 190 from replacement computer 171. Each of surviving participating computers 162-164 sends a respective local result (not shown) to DBMS 110. DBMS 110 may combine or otherwise process the received local results. Restarting execution of offload query plan 150 means that repeated distributed execution attempts by a same surviving participating computer may cause a local result to be twice generated and sent. DBMS 110 may discard a duplicate local result.

3.0 Example Offload Recovery Activities

Figure 3:
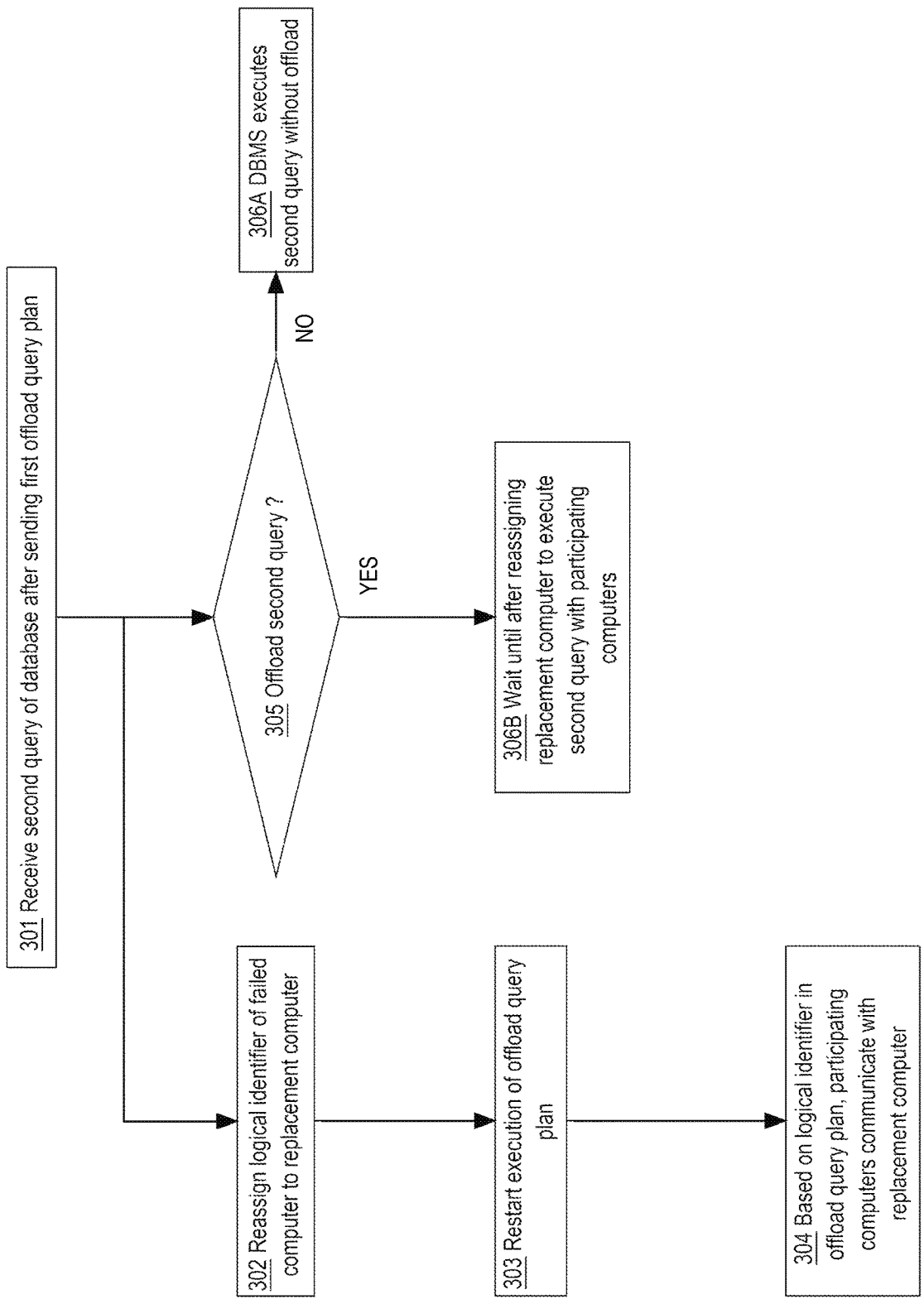
FIG. 3 is a flow diagram that depicts example offload recovery activities that may occur for distributed query execution of two offloaded queries.

FIG. 3 is a flow diagram that depicts example offload recovery activities that may occur for distributed query execution of two offloaded queries. The distributed system that performs the process of FIG. 3 may be an implementation of distributed system 100.

The process of FIG. 3 does not begin until offloaded execution of a first query is ongoing and a participating computer crashed. The process of FIG. 3 begins while a spare computer is being reconfigured to replace the crashed computer. Step 301 receives a second query of a database before the replacement computer is ready for query execution. Handling of the second query is discussed later herein with steps 305 and 306A-B.

For executing both queries are two respective subprocesses that may or may not concurrently occur and begin with respective steps 302 and 305. That is, steps 302-304 resume execution of the first query, and steps 305 and 306A-B execute the second query. For demonstration, the subprocess of the ongoing first query is discussed first.

Step 302 reassigns a logical identifier of the failed computer to the replacement computer from the spares. All of the participating computers store a local copy of an identifier map that bidirectionally maps logical identifiers to physical identifiers of participating computers. In an embodiment the identifier map is an array of physical identifiers at respective offsets in the array, and the logical identifiers are implied by the offset and are not actually stored.

When a participating computer fails, the surviving participating computers indicate the failure in their local copy of the identifier map. Reassignment, by step 302, of the logical identifier of the failed computer to the replacement computer of the spares causes: a) the surviving participating computers update their local copies of the identifier map to indicate that the logical identifier is now assigned to the replacement computer such that the reassigned logical identifier maps to the physical identifier of the replacement computer, and b) a copy of the updated identifier map is sent to the replacement computer.

Between steps 302-303, conversion of the replacement computer into a participating computer completes, and the distributed system returns to full service. Queries received after this point achieve distributed execution. Step 303 restarts distributed execution of the first query, which does not entail regenerating nor recompiling the offload query plan as discussed earlier herein.

Based on the reassigned logical identifier in offload query plan of the restarted first query, none, some, or all surviving participating computers communicate with the replacement computer in step 304. For example, the offload query plan of the first query may implement a SQL GROUP BY or ORDER BY clause that specifies a month column based on peer-to-peer dataflow between participating computers as follows.

If there are twelve participating computers, each participating computer may process its local horizontal partition of a database table by sending each table row to a participating computer that corresponds to the month column value of the table row. For example, a numeric month may be the receiving logical identifier of the participating computer to receive the table row from a sending participating computer. The sending participating computer may use that receiving logical identifier, as specified in the offload query plan, as a lookup key into the identifier map to determine the physical identifier of the receiving participating computer to send that table row to. If the receiving logical identifier was reassigned to the replacement computer, the replacement computer receives that table row even if that table row was previously sent to the failed computer before the failed computer crashed.

Various pathological scenarios may impact reassignment of a logical identifier from a failed computer to a replacement computer. For example, a so-called split brain may occur when DBMS 110 mistakenly decides that a participating computer has crashed but that participating computer continues operation. In that case, the logical identifier of the participating computer is reassigned to a replacement computer even though the participating computer still operates, which means that two computers are erroneously sharing a same logical identifier despite having separate physical identifiers. Even if the participating computer crashes without split brain, transport latency as discussed later herein may cause a message from the failed computer to be received and/or inspected after the logical identifier is reassigned.

For those various reasons, when a message is received from a participating computer, the participating computer's physical identifier contained in the message should be used as a lookup key in the identifier map to detect whether or not that physical identifier is still bound to a logical identifier. If DBMS 110 believes that that participating computer crashed, that physical identifier would be unbound in the identifier map. In an embodiment, a receiving participating computer ignores any received message that contains logical and physical identifiers of a sending participating computer that do not exactly match a bound pair of logical and physical identifiers in the identifier map.

That subprocess of steps 302-204 may continue until distributed execution of the first query completes. Concurrently or not to that subprocess is a second subprocess that entails steps 305 and 306A-B for executing the second query. Step 305 occurs before the replacement computer is ready for query execution.

Step 305 decides whether or not to offload the second query. An embodiment may estimate durations of the following activities: a) distributed execution of the second query, b) readying the replacement computer for query execution, including sending the failed computer's portion of the database from the DBMS to the replacement computer, and c) execution of the second query by the DBMS itself without offloading. For example if (a) plus (b) does not exceed (c), the DBMS may choose to offload the second query.

Steps 306A-B are mutually exclusive activities based on whether or not the DBMS decides to offload the second query. If not, the DBMS by itself executes the second query without offloading in step 306A. Otherwise, step 306B waits until the replacement computer is ready for query execution and then offloads the second query for distributed execution by the surviving participating computers and the replacement computer.

4.0 Fault Tolerance Activities

Figure 4:
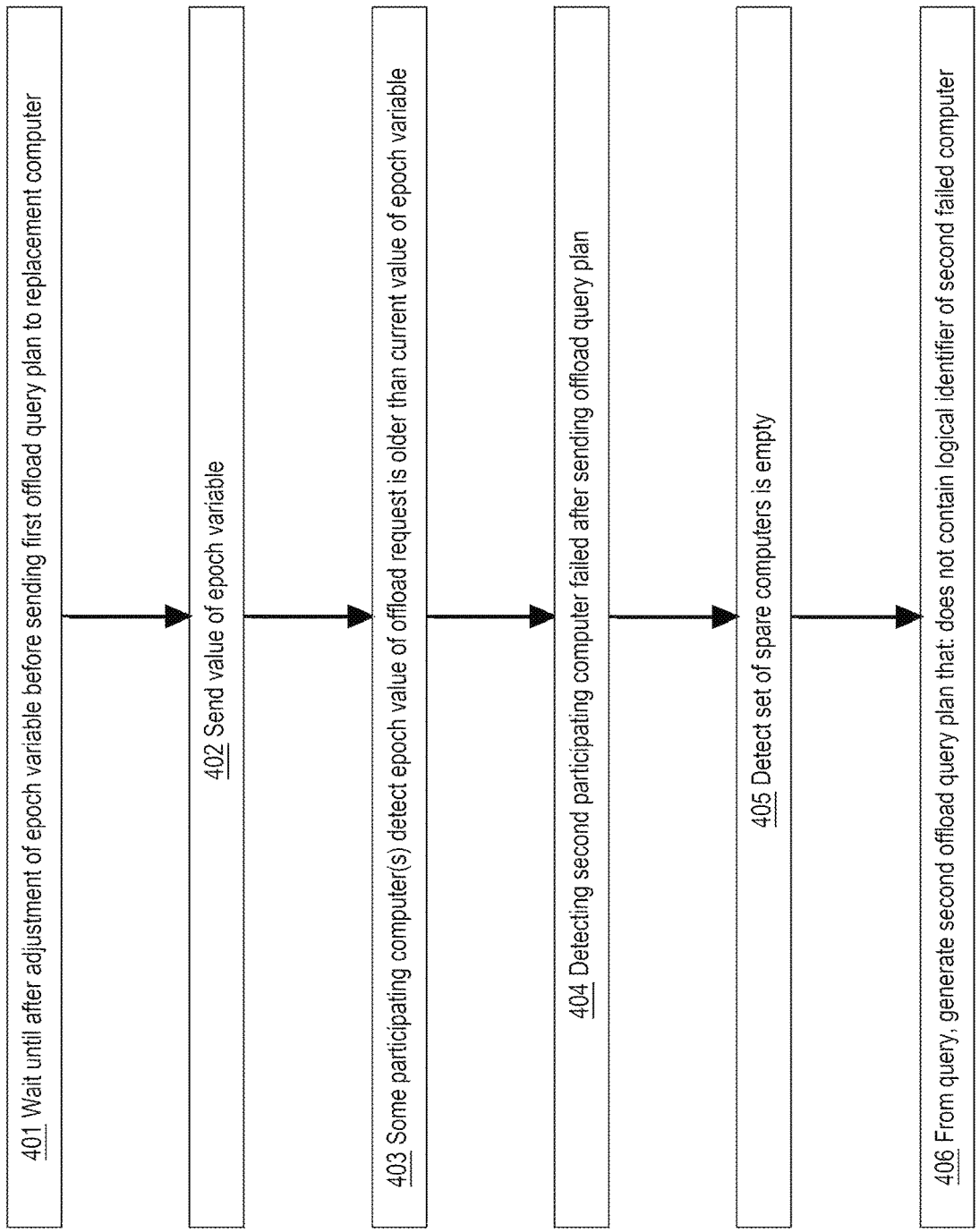
FIG. 4 is a flow diagram that depicts example fault tolerance activities that may occur for distributed query execution of an offloaded query.

FIG. 4 is a flow diagram that depicts example fault tolerance activities that may occur for distributed query execution of an offloaded query. The distributed system that performs the process of FIG. 4 may be an implementation of distributed system 100.

The process of FIG. 4 does not begin until offloaded execution of a query is ongoing and a participating computer crashed. The process of FIG. 4 begins while a replacement computer from spares is being reconfigured to replace the crashed computer. In other words, the replacement computer is still unready for query execution.

An epoch is a period of undisturbed operation during which no participating computer crashes. Two epochs are separated by at least one participating computer crashing. How many epochs occur when two participating computers crash depends on when a replacement computer of spares finishes conversion into a participating computer. If the second crash occurs before replacement finishes for the first crash, then a new epoch does not occur until both crashed computers are replaced by spares. If replacement finishes before the second crash, then replacement of the first crash causes a new epoch, and replacement of the second crash causes another new epoch. In other words, two crashes may cause one or two new epochs depending on whether or not the two crashes overlap.

It does not matter how many participating computers crashed and are still being replaced when step 401 begins so long as at least one replacement computer is still unready for query execution due to ongoing conversion from being a spare. The distributed system maintains a globally readable epoch variable that identifies which epoch is current in a sequence of epochs that are identified by timestamp or by monotonically increasing serial number such that two epoch identifiers may be compared to detect which of two epochs is older. For example, a coherent replica of the epoch variable may be hosted by the DBMS and each participating computer. Thus, every participating computer knows what is the current epoch and can detect whether a received epoch identifier is no longer current.

When conversion of enough replacement computers from spares finishes after crash(es), the distributed system is ready for query execution and the DBMS adjusts the epoch variable, which may entail incrementing a serial number or latching a current timestamp. Step 401 waits until after adjustment of the epoch variable before sending the offload query plan to replacement computer(s) and surviving participating computers to restart distributed execution of the query.

The DBMS redistributes the same offload query plan after crash(es) as was sent before the crash(es). With the offload query plan, the DBMS also sends the adjusted value of the epoch variable in step 402. For example, a message from the DBMS may contain the offload query plan and an identifier of the current epoch when sent.

Whether or not the epoch identifier in the message remains current by the time a participating computer eventually processes the message depends on the scenario. For example, the DBMS may have many clients that submit queries for concurrent execution by the same participating computers such that a participating computer may concurrently execute multiple offload query plans that were dispatched during the current epoch. In an embodiment, those same participating computers are shared by multiple DBMSs that currently offload queries.

Thus, participating computers may be heavily loaded with concurrently executing offload query plans. Likewise, participating computers may have a backlog of received offload query plans that await execution. Furthermore, the topology of the distributed system may entail multi-hop store-and-forward delivery of messages to the participating computers from the DBMS such that fluctuating transport latency may cause different participating computers to receive a same offload query plan at slightly different times. In other words, when the DBMS sends an offload query plan, when a participating computer receives the offload query plan, and when the participating computer starts executing the offload query plan may be three different times.

Indeed, such offload delays may be sufficient to cause various race conditions in which an epoch identifier sent with an offload query plan is no longer current when a participating computer can start executing the offload query plan, in which case the epoch identifier is stale and the associated request to execute the offload query plan is stale. That does not mean that the offload query plan itself is stale, but merely that the DBMS has or will send another request that contains the same offload query plan and a new epoch identifier. In other words, because crashes cause the DBMS to resend a same offload query plan to surviving computers, a surviving computer may receive redundant requests to execute a same offload query plan but with distinct epoch identifiers.

It is tolerable for a participating computer to perform multiple concurrent executions of a same offload query plan due to redundant requests. However, it is more efficient to avoid redundant executions. Thus: a) a participating computer will ignore any request that identifies a stale epoch and, in an embodiment, b) a participating computer may abandon or abort none, some, or all ongoing executions when the epoch variable is adjusted, especially as discussed later herein. For example in step 403, some participating computer(s) detect an epoch value of an offload request is older than a current value of the epoch variable.

As discussed above, steps 401-403 provide fault tolerance that may be more or less straightforward so long as every crashed computer can be replaced by a spare computer. However, supply of spare computers is bounded such that too many crashes may exhaust the supply of spares, in which case a subsequent crash may need special handling as follows. For example soon after the last spare computer is converted into a replacement computer, step 404 detects that another participating computer crashes. In an attempt to select a replacement computer from spares, step 405 detects that there is no available spare computer because the pool of spares is empty.

When a crashed computer cannot be replaced with a spare computer, the DBMS should generate a new offload query plan for each existing offload query plan that has not finished distributed execution. A regenerated offload query plan is functionally equivalent except as follows.

As explained earlier herein, an offload query plan contains logical identifiers for all participating computers. Usually a logical identifier of a crashed computer is reassigned to a replacement computer. However without spares, there is no replacement computer to be assigned that logical identifier. In that case, the logical identifier of the crashed computer should cease to be used. Thus when no spare computers are available, step 406 should regenerate an offload query plan that contains only logical identifiers of surviving computers and should not contain the logical identifier(s) of any crashed computer(s) that cannot be replaced due to lack of spare computers.

In that case, the distributed system should operate by offloading only to the surviving computers, which is fewer participating computers than before. Because the DBMS partitions data such that there is a one-to-one correspondence of partitions to participating computers, using fewer participating computers requires repartitioning same data into fewer and bigger partitions to send to the surviving computers along with the regenerated offload query plan that has fewer logical identifiers. In that way, the distributed system can tolerate loss of participating computers without replacement. In various embodiments the unit of granularity for partitioning data may be a table row, a database block containing multiple rows of a same table, or a database extent containing multiple database blocks of a same table. For example, each portion of data sent to each participating computer may contain approximately a same amount of table rows, database blocks, or database extents.

5.0 Example Spare Computer Activities

Figure 5:
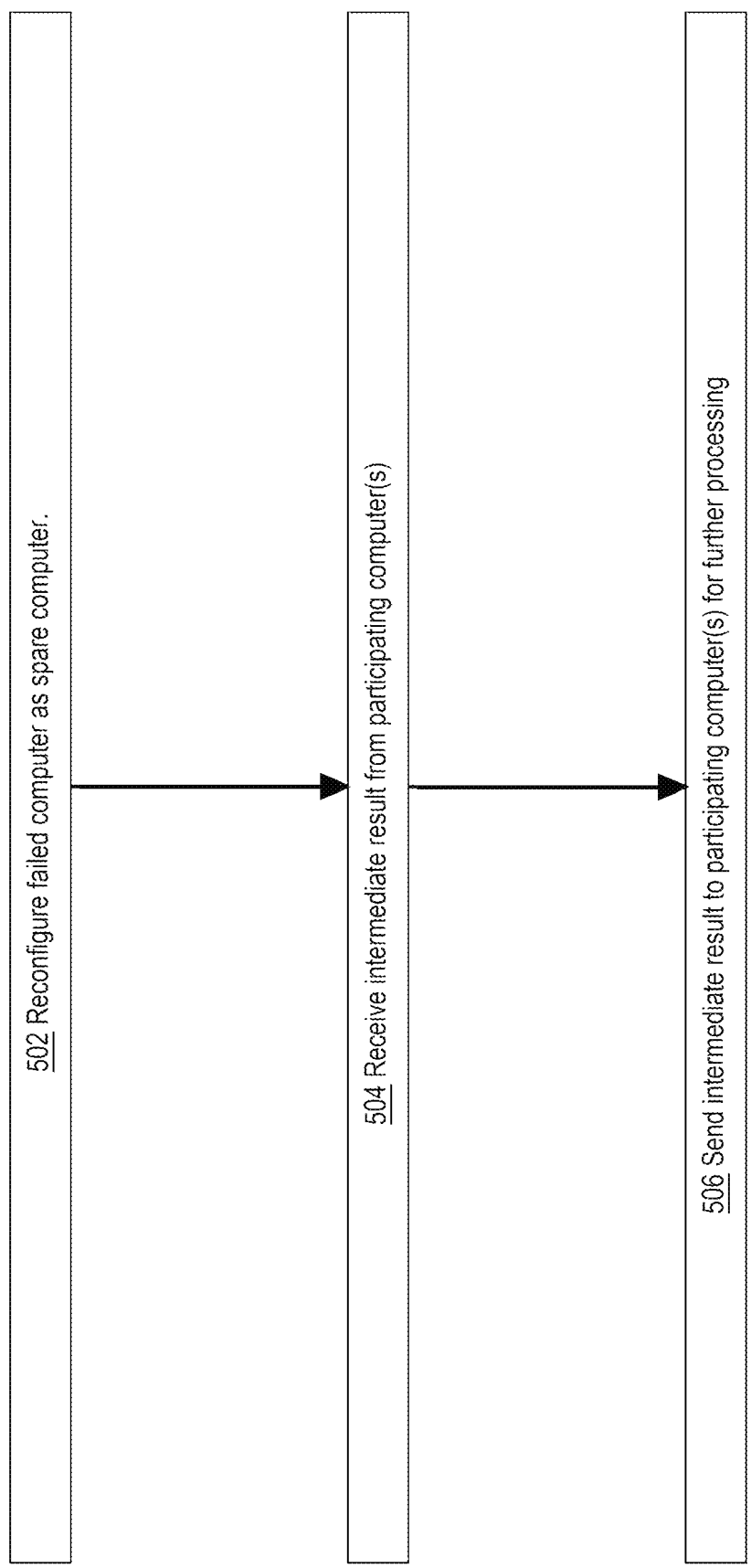
FIG. 5 is a flow diagram that depicts example activities of a spare computer.

FIG. 5 is a flow diagram that depicts example activities of a spare computer. The distributed system that performs the process of FIG. 5 may be an implementation of distributed system 100. The process of FIG. 5 does not begin until a participating computer crashed.

Depending on the nature of the crash, the failed computer's outage may be somewhat prolonged, such as with a disk crash, or brief such as curable by a computer reboot or application relaunch. In any case, the failed computer may eventually return to service as follows.

Step 502 reconfigures the failed computer as a spare computer. For example, the identifier map may mark the physical identifier of that computer as a spare computer. In the identifier map, a spare computer is not assigned a logical identifier. If the distributed system is operating with a reduced amount of participating computers as discussed earlier herein, then step 502 may instead reinstate the computer as a participating computer so that future offloads have more participating computers.

For a given capital expenditure, there may be a design tradeoff between purchasing few powerful computers versus purchasing many less powerful computers. Fault tolerance favors more computers for various reasons such as having more spare computers and having a smaller data portion to send to a replacement computer. A penalty for having more computers of less capacity is an increased likelihood that a participating computer may generate more temporary data during query execution than the participating computer can store, especially if concurrently executing multiple queries.

In an embodiment, when a participating computer overflows with data, excess data may spill to a spare computer for temporary storage. That is in step 504, a spare computer receives intermediate results from participating computer(s) for temporary caching in volatile or nonvolatile storage of the spare computer. Likewise, step 506 eventually sends intermediate results back to participating computer(s) for further processing. In an embodiment and regardless of direction of the transfer of temporary data, the participating computer and not the spare computer initiates the transfer. An embodiment may use remote direct memory access (RDMA) to remotely transfer temporary data into and out of volatile memory of the spare computer.

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL")

query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
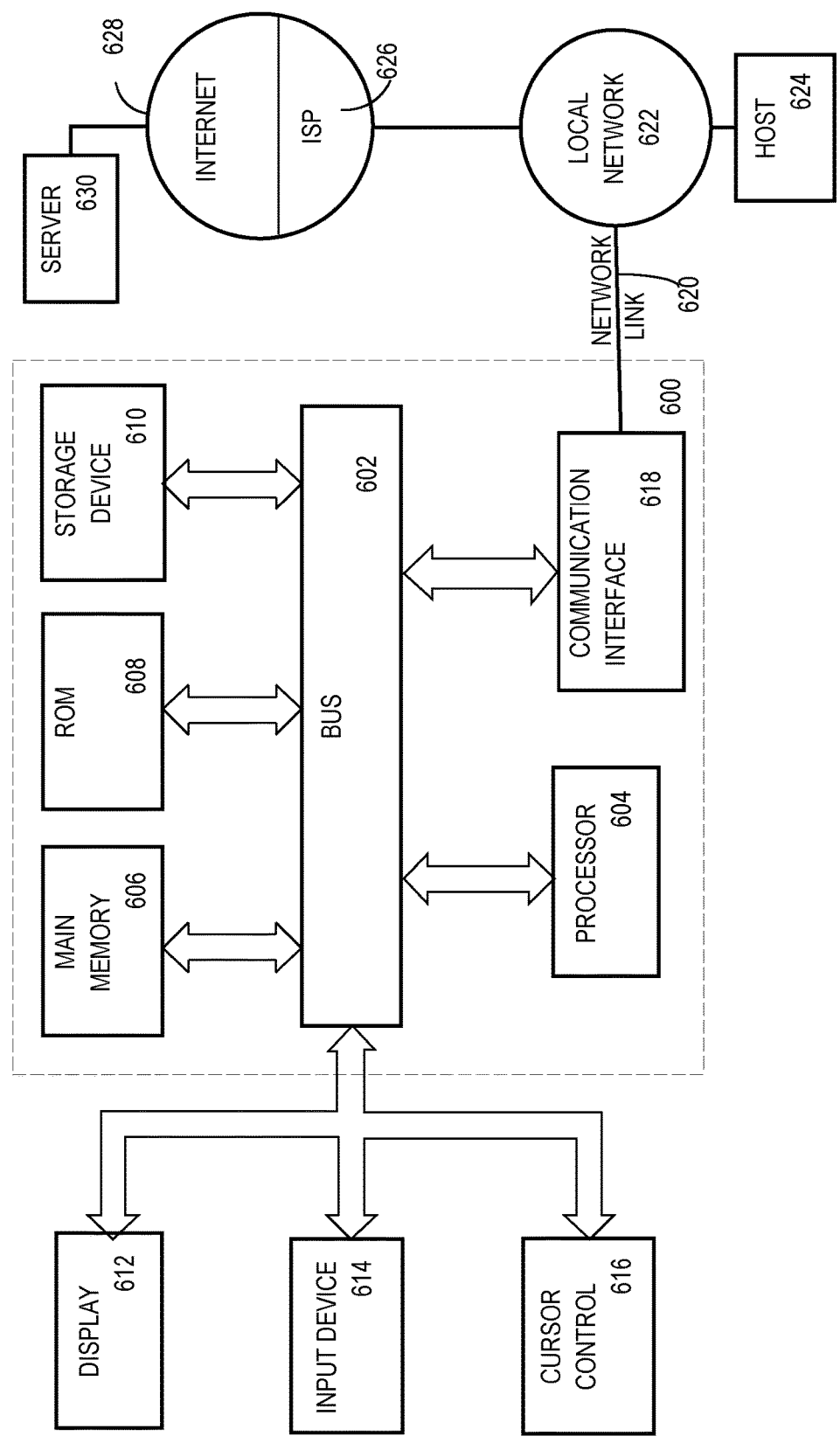
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
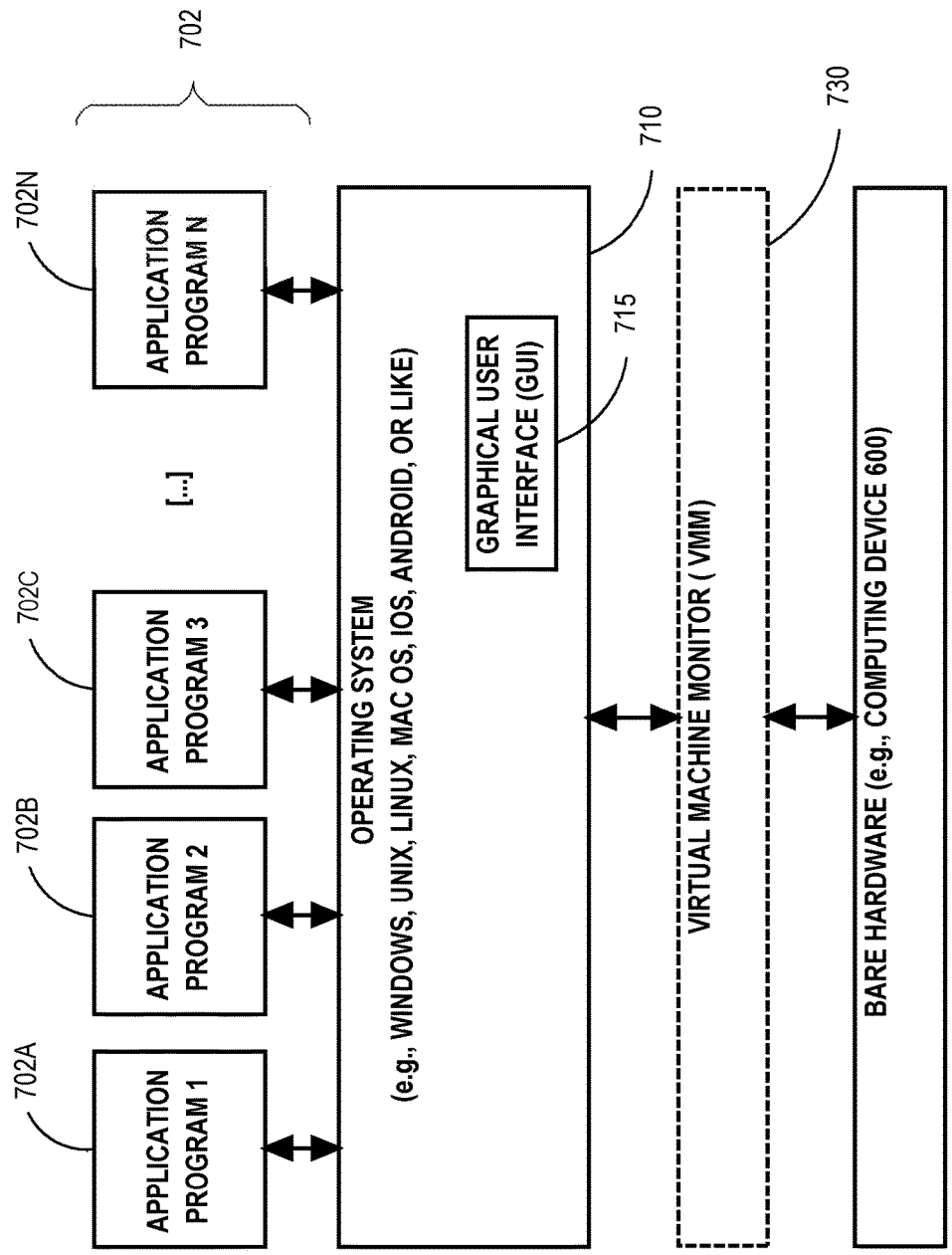
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   configuring a plurality of spare computers that does not contain a plurality of participating computers;
   receiving, by a database management system (DBMS), a query of a database;
   generating, from the query of the database, an offload query plan;
   sending, by the DBMS, said offload query plan and a respective portion of the database to each computer of the plurality of participating computers;
   detecting that a failed computer of the plurality of participating computers failed after said sending said offload query plan;
   in response to said detecting that the failed computer failed:
      reassigning a logical identifier of the failed computer to a replacement computer of the plurality of spare computers, and
      sending said offload query plan and said respective portion of the database of said failed computer to the replacement computer;
   receiving, by the DBMS, results of successful distributed execution of said offload query plan that include a result from the replacement computer.

2. The method of claim 1 further comprising:
   in response to said detecting that the failed computer failed, reassigning the replacement computer from the plurality of spare computers to the plurality of participating computers;
   receiving a second query of the database after said sending said offload query plan and before said reassigning the replacement computer;
   executing, based on said detecting that the failed computer failed, the second query by waiting until after said reassigning the replacement computer to execute the second query with the plurality of participating computers.

3. The method of claim 1 wherein:
   said offload query plan contains said logical identifier of the failed computer;
   the method further comprises one or more computers of the plurality of participating computers communicating, based on said logical identifier in said offload query plan, with the replacement computer.

4. The method of claim 3 wherein said communicating with the replacement computer is in response to the plurality of participating computers, excluding the failed computer, restarting execution of said offload query plan.

5. The method of claim 4 wherein said restarting execution of said offload query plan does not comprise resending, by the DBMS, said offload query plan.

6. The method of claim 1 wherein said sending said offload query plan to the replacement computer comprises waiting until after an adjustment of an epoch variable selected from the group consisting of: a counter, and a timestamp.

7. The method of claim 1 wherein:
said sending said offload query plan comprises sending a particular value of an epoch variable;
the method further comprises at least one computer of the plurality of participating computers detecting that said particular value of the epoch variable is older than a current value of the epoch variable.

8. The method of claim 1 further comprising reassigning the failed computer from the plurality of participating computers to the plurality of spare computers.

9. The method of claim 1 wherein the plurality of participating computers and the replacement computer do not store said respective portions of the database in nonvolatile storage.

10. The method of claim 1 further comprising populating the plurality of spare computers with similar respective amounts of computers that are directly connected to a respective network switch of a plurality of network switches.

11. The method of claim 1 further comprising at least one spare computer of the plurality of spare computers, without receiving said offload query plan:
receiving an intermediate result from at least one computer of the plurality of participating computers, and
sending the intermediate result to at least one computer of the plurality of participating computers for further processing.

12. The method of claim 1 wherein the plurality of participating computers contains at least two thousand computers.

13. The method of claim 1 further comprising:
in response to said detecting that the failed computer failed, reassigning the replacement computer from the plurality of spare computers to the plurality of participating computers;
receiving a second query of the database after said sending said offload query plan and before said reassigning the replacement computer;
executing, based on said detecting that the failed computer failed, the second query without the plurality of participating computers.

14. A method comprising:
configuring a plurality of spare computers that does not contain a plurality of participating computers;
receiving, by a database management system (DBMS), a query of a database;
generating, from said query of the database, a first offload query plan that contains:
a first logical identifier of a first failed computer of the plurality of participating computers, and
a second logical identifier of a second failed computer of the plurality of participating computers;
first sending, by the DBMS, said first offload query plan and a respective first portion of the database to each computer of the plurality of participating computers;
first detecting that said first failed computer failed after said first sending said first offload query plan;
second sending, in response to said first detecting that the first failed computer failed, said first offload query plan and said respective first portion of the database of said first failed computer to a replacement computer of the plurality of spare computers;
second detecting that said second failed computer failed after said second sending said first offload query plan;
in response to said second detecting that the second failed computer failed:
a) detecting said plurality of spare computers is empty;
b) regenerating, from said query, a second offload query plan that does not contain said second logical identifier of said second failed computer;
c) repartitioning the database into a plurality of second portions; and
d) third sending said second offload query plan and a respective second portion of the plurality of second portions to each computer of the plurality of participating computers that has not failed;
receiving, by the DBMS, results of successful distributed execution of said second offload query plan that include a result from the replacement computer.

15. One or more non-transitory computer-readable media storing instructions that, when executed by one or more processors, cause:
configuring a plurality of spare computers that does not contain a plurality of participating computers;
receiving, by a database management system (DBMS), a query of a database;
generating, from the query of the database, an offload query plan;
sending, by the DBMS, said offload query plan and a respective portion of the database to each computer of the plurality of participating computers;
detecting that a failed computer of the plurality of participating computers failed after said sending said offload query plan;
in response to said detecting that the failed computer failed:
reassigning a logical identifier of the failed computer to a replacement computer of the plurality of spare computers, and
sending said offload query plan and said respective portion of the database of said failed computer to the replacement computer;
receiving, by the DBMS, results of successful distributed execution of said offload query plan that include a result from the replacement computer.

16. The one or more non-transitory computer-readable media of claim 15 wherein the instructions further cause:
in response to said detecting that the failed computer failed, reassigning the replacement computer from the plurality of spare computers to the plurality of participating computers;
receiving a second query of the database after said sending said offload query plan and before said reassigning the replacement computer;
executing, based on said detecting that the failed computer failed, the second query with a strategy selected from the group consisting of:
the DBMS executing the second query without the plurality of participating computers, and
waiting until after said reassigning the replacement computer to execute the second query with the plurality of participating computers.

17. The one or more non-transitory computer-readable media of claim 15 wherein:
said sending said offload query plan comprises sending a particular value of an epoch variable;
the instructions further cause at least one computer of the plurality of participating computers detecting that said particular value of the epoch variable is older than a current value of the epoch variable.

18. The one or more non-transitory computer-readable media of claim 15 wherein the instructions further cause at least one spare computer of the plurality of spare computers, without receiving said offload query plan:
  receiving an intermediate result from at least one computer of the plurality of participating computers, and
  sending the intermediate result to at least one computer of the plurality of participating computers for further processing.

19. One or more non-transitory computer-readable media storing instructions that, when executed by one or more processors, cause:
  configuring a plurality of spare computers that does not contain a plurality of participating computers;
  receiving, by a database management system (DBMS), a query of a database;
  generating, from said query of the database, a first offload query plan that contains:
    a first logical identifier of a first failed computer of the plurality of participating computers, and
    a second logical identifier of a second failed computer of the plurality of participating computers;
  first sending, by the DBMS, said first offload query plan and a respective first portion of the database to each computer of the plurality of participating computers;
  first detecting that said first failed computer failed after said first sending said first offload query plan;
  second sending, in response to said first detecting that the first failed computer failed, said first offload query plan and said respective first portion of the database of said first failed computer to a replacement computer of the plurality of spare computers;
  second detecting that said second failed computer failed after said second sending said first offload query plan;
  in response to said second detecting that the second failed computer failed:
    a) detecting said plurality of spare computers is empty;
    b) regenerating, from said query, a second offload query plan that does not contain said second logical identifier of said second failed computer;
    c) repartitioning the database into a plurality of second portions; and
    d) third sending said second offload query plan and a respective second portion of the plurality of second portions to each computer of the plurality of participating computers that has not failed;
  receiving, by the DBMS, results of successful distributed execution of said second offload query plan that include a result from the replacement computer.

* * * * *

UNITED STATES PATENT AND TRADEMARK OFFICE
CERTIFICATE OF CORRECTION

PATENT NO. : 11,455,219 B2
APPLICATION NO. : 17/077028
DATED : September 27, 2022
INVENTOR(S) : Pasupuleti et al.

It is certified that error appears in the above-identified patent and that said Letters Patent is hereby corrected as shown below:

In the Specification

In Column 14, Line 28, delete "SQL/WL" and insert -- SQL/XML --, therefor.

Signed and Sealed this
Twenty-first Day of March, 2023

Katherine Kelly Vidal
*Director of the United States Patent and Trademark Office*